No. 636,516. Patented Nov. 7, 1899.
W. H. GATES.
LACING CORD FASTENER.
(Application filed Apr. 7, 1899.)
(No Model.)
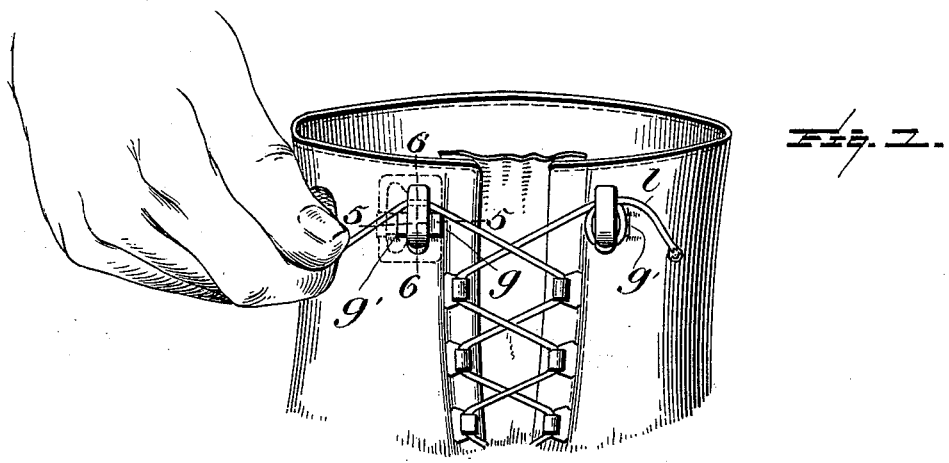
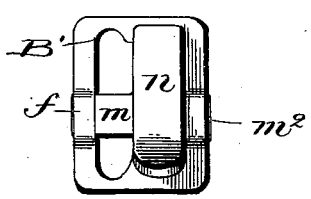
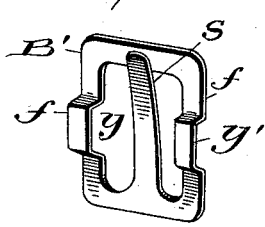
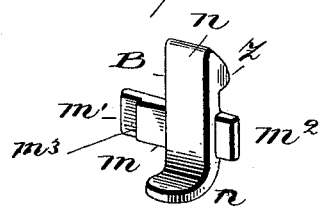
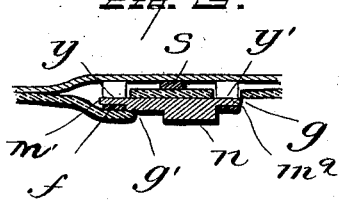
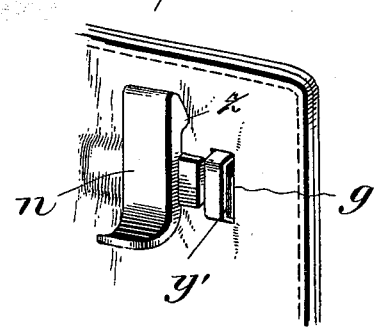
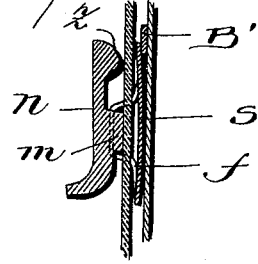
Witnesses:
L. C. Hills.
Inventor:
William H. Gates,
By his Atty.

UNITED STATES PATENT OFFICE.

WILLIAM H. GATES, OF BALTIMORE, MARYLAND, ASSIGNOR TO THE GATES LACING HOOK COMPANY, OF WILMINGTON, DELAWARE.

LACING-CORD FASTENER.

SPECIFICATION forming part of Letters Patent No. 636,516, dated November 7, 1899.

Application filed April 7, 1899. Serial No. 712,160. (No model.)

*To all whom it may concern:*

Be it known that I, WILLIAM H. GATES, of Baltimore, in the State of Maryland, have invented a certain new and useful Lacing-Cord Fastener, of which the following is a specification.

The fastener in which my invention is embodied is intended, primarily, for use in laced boots or shoes, and it is in that connection that I shall describe it. I desire it to be understood, however, that it may be applied as well to gloves or other articles where a lacing-cord is used.

My fastener is one composed of a base and a body which are detachably interlocked with each other, and I so arrange things that when the device is applied to the border of a boot, shoe, or other article the two parts of the device will interlock not only with each other, but also with the border of the shoe, thus at one operation and by the same means both locking the parts together and securing them in place upon the border.

I shall first describe my lacing-cord fastener by reference to the accompanying drawings and will then more particularly point out in the claims those features which I believe to be new and of my own invention.

The drawings illustrate the preferred embodiment of my invention; but I desire it to be understood that the structure may be varied somewhat without departure from the spirit of the invention.

In the drawings, Figure 1 is a perspective view of a portion of a laced shoe with my improved fastener applied thereto. Fig. 2 is a plan of the complete fastener. Figs. 3 and 4 are perspective views of the two parts of the fastener detached from one another. Fig. 5 is a section on line 5 5, Fig. 1. Fig. 6 is a section on line 6 6, Fig. 1. Fig. 7 is a view illustrative of the manner of applying the device to the lacing-border and of interlocking its parts with each other and with the lacing-border.

The shoe to which the fastener is represented as applied is one which is provided with lacing hooks and borders, such as described in my allowed application for Letters Patent, filed February 18, 1898, Serial No. 670,820.

The fastener is composed of two interlocking parts, the body B and the base B'. (Shown separately in Figs. 3 and 4.) The body B is cross-like in form and is composed of two limbs or bars $m$ $n$, rigidly secured together, the two crossing one another at about right angles and the limb $n$ being superposed upon the limb $m$. The part $m$ is a flat cross-bar of rectangular cross-section whose ends $m'$ $m^2$ are adapted to catch under and interlock with the side bars $f$ of the base B', as hereinafter described. The cross-bar $m$ has preferably formed near its end $m'$ a shoulder $m^3$, by means of which the cross-piece B is prevented from slipping to one side in the base B'. The superposed part $n$ has at its upper end a hook-like portion $z$ on its under side, and its opposite end is flared or curved outwardly or upwardly to facilitate the passage of the cord into position in the fastener. The base B' is a flat rectangular skeleton spring-frame, preferably made of spring-steel, having formed in its side bars recesses $y$ $y'$ for reception of the ends $m'$ $m^2$ of the cross-bar $m$ and having also a spring-tongue $s$, which extends across the frame from one end bar to the other, being attached to or integral with one of said end bars, as shown, and slightly overlapping the opposite end bar.

The fastener is applied to the lacing-border between the upper and the lining of the shoe. In addition to the front slot $g$ in the upper at the lacing-border there is formed in the upper a second slot $g'$, say about a quarter of an inch in rear of the slot $g$. The base B' is placed between the upper and the lining of the shoe and is brought to a position in which its recessed part $y'$ will project through the front slot $g$ in the border, while its recessed part $y$ will be directly in rear of the slot $g'$. Next the rear end $m'$ of the bar $m$ is inserted through the rear slot $g'$ in the border and is pushed rearwardly beneath the recessed base B' far enough to bring the front end $m^2$ of said bar $m$ back of the front recessed part $y'$ of the base B', which projects through the front slot $g$ in the upper. The parts are shown in this position in Fig. 7. Then by pressing downward and forward upon the body B the rear end $m'$ of bar $m$ will be pushed forward upon the base B', the front end $m^2$ of the bar $m$ will be pushed forward and under the recessed part $y'$, and both ends $m'$ and $m^2$ will be sprung simultaneously into place, with the effect not only of interlocking the two parts of the fastener with each other, but of interlocking the fastener as a whole with the lacing-border, as will be readily understood by reference to Fig. 6 without further explanation. This manner of applying the fastener is permitted by the spring-like character of the base, its side bars, as well as its central tongue $s$, being spring-yielding. By the same spring action the parts of the fastener when once fitted into place are held most securely together and to the upper, while at the same time they are sufficiently adjustable to each other to permit the easy entrance of the lacing-cord and its being wrapped around the angular central part formed by the intersection of the two portions $m$ $n$ of the body B.

The device can be used as a right or left hand fastener, if desired. In that case I set a hook opposite the fastener, and by wrapping the two ends of the cord in opposite directions under the limb $n$ I find the result quite admirable; but on account of the relief to the ankle in walking I prefer to use a pair of fasteners, (a right and a left,) as shown in Fig. 1, whereby I get the diagonal and spring-like finish of the lacing instead of the unyielding direct-across finish where but one fastener is employed for both ends of the cord. In order to increase its holding effect upon the cord, I prefer to locate the body B so that the front edge of its limb $n$ shall be about in line with the rear edge of the front side bar of the base B', and as the former lies superposed above the latter at a distance slightly less than the thickness of the lacing-cord a slight flattening of the cord must result at the point where it enters and leaves the fastener. The pinching action also takes place during the passage of the cord past the hook-like projection $z$ on the limb $n$, which projection serves to retain the cord in its position upon the fastener. Secured in place by the interlocking of its parts with one another and with the upper, with its broad base at the front resting against the seam $o$ of the lacing-border, the fastener is held most firmly. The end of the lacing-cord $l$ is entered first behind the hook end of the limb $n$ and then in crooked angular course around the central part of the body B, and thence finally back again between the hook end of the limb $n$ and the upper. In this way the cord is held most securely and tightly without possibility of slip.

I prefer a lacing-cord cylindrical in cross-section for the reason, among others, that the important element of uniform thickness is always obtainable in lacings of that shape.

It will be noted that the fastener is one in which a body consisting of superposed members is detachably interlocked with a spring-acting base which automatically acts to securely lock the lacing-cord, which is carried around the central portion of the body in the path provided for it at the point where the two members of the body intersect or cross each other. This I believe to be new with me. I also believe myself to be the first to have devised a lacing-cord fastener consisting of a body portion and a spring-acting base adapted to be applied to opposite faces of the border or upper and to be interlocked with each other and the said border or upper. I do not therefore restrict myself to the precise structural details hereinbefore described, and shown in the illustration of my invention; but

What I claim herein as new, and desire to secure by Letters Patent, is—

1. A lacing-cord fastener, consisting of a cross-like body composed of superposed limbs or members having an angular path for the lacing-cord at the point where they intersect or cross one another, in combination with a spring-acting base interlocked with said body and adapted to automatically lock the lacing-cord in place in the fastener, substantially as and for the purposes hereinbefore set forth.

2. A lacing-cord fastener, consisting of a body of cross-like shape, adapted to be applied to one face of a border or upper, a spring-acting base adapted to be applied to the opposite face of said border or upper, and means carried by the body and base respectively whereby said parts may be interlocked with each other and with the intervening portion of the border or upper, substantially as and for the purposes hereinbefore set forth.

3. The skeleton spring-metal base having recesses $y$ $y'$ in its side bars, in combination with the body composed of superposed members or limbs, which provide at their point of intersection or crossing an angular path for the passage of the lacing-cord, and having ends $m'$ $m^2$ to engage the recesses $y$ $y'$ in the side bars of the base, substantially as and for the purposes hereinbefore set forth.

4. A lacing-cord fastener composed of the skeleton spring-metal base provided with side recesses $y$ $y'$ and spring-tongue $s$, and the cross-like body composed of the member $m$ having ends $m'$ $m^2$ to engage the recesses $y$ $y'$, and the superposed member $n$, having the hook or projection $z$, substantially as and for the purposes hereinbefore set forth.

In testimony whereof I have hereunto set my hand this 21st day of October, 1898.

WILLIAM H. GATES.

Witnesses:
  WM. V. LYONS,
  EDW. EAGER.